United States Patent Office 2,743,344
Patented Apr. 24, 1956

2,743,344
ARC-WELDING OF NON-FERROUS METAL AND ITS ALLOY

Alfred Schüssler, Frankfurt am Main, Heddernheim, Germany, assignor to Vereinigte Deutsche Metallwerke Aktiengesellschaft, Frankfurt am Main, Heddernheim, Germany No Drawing. Application July 27, 1951,
Serial No. 239,004

Claims priority, application Germany August 4, 1950

3 Claims. (Cl. 219—10)

The present invention relates to a process for arc-welding of non-ferrous metals and their alloys, particularly copper and its alloys.

It is known that the welding of non-ferrous metals, particularly copper and its alloys, requires very special experience. The strong tendency of these metals to oxidize and their high heat conductivity renders it necessary to take precautions which are entirely unnecessary in the welding of ferrous metals.

Copper and its alloys are usually welded by gas welding processes employing an oxyacetylene torch. Such gas welding is, however, difficult to carry out, as it requires close control of the flame of the welding torch and normally requires preheating of the pieces to be joined. This not only renders it necessary that the welding be performed by skilled operators but the preheating of the pieces to be joined, which often is to a red heat, is unpleasant to the operator and also tends to cause uncontrollable tensions and strains in the welded product, particularly if the pieces joined are large.

Electric welding processes are also known for copper and certain of its alloys. These processes employ electrodes of a material which is the same or similar to that welded, or use a filler rod of such material. The electric welding processes for copper and its alloys are best carried out with exactly controlled welding machines, so that they are normally only suitable for mass production. Even then many difficulties are encountered with electric welding. Either the seams require subsequent treatment or the strength of the seams is substantially under that of the material joined.

In accordance with the invention it has unexpectedly been discovered that non-ferrous metals and their alloys, especially copper and copper base alloys, can be arc-welded with austenitic alloy steel electrodes. The welded joints obtained are not only stronger than those previously obtainable with known welding processes, but they are also completely pore-free as soon as they are produced. The arc-welding process in accordance with the invention does not require preheating of the pieces to be joined, and furthermore the welding speed is considerably above that of gas-welding.

The welding electrodes employed in accordance with the invention can be coated or uncoated. The coatings can contain numerous materials. For example, the coating materials may be selected from the oxides, carbonates, carbonyls, silicates, chlorides, fluorides and other compounds of metals and non-metals. In order to produce a protective gas, organic substances can be added. The slag produced by the coating can be acid or basic. Its character is primarily determined by its contents of $SiO_2$ (acid) and $CaO$ (basic).

Normal fluxing materials which dissolve the metal oxides which may be formed during welding can be used with advantage in accordance with the invention. The fluxes can be composed of boric acid, silicon, fluorspar, sodium and calcium chloride, sodium carbonate and the like.

The electrodes employed in accordance with the invention are alloy steels which contain a sufficient quantity of an alloying element or alloying elements to render such alloy austenitic at room temperature. Such alloying elements are, for example, nickel, chromium, silicon, manganese, copper and the like. The electrodes can also contain other elements; such as, for example, small quantities of molybdenum, vanadium, tantalum, niobium, thorium, cobalt and the like to obtain specific desired properties. The austenitic chromium-nickel steels have been found especially suitable for the electrodes employed in accordance with the invention; for example, those containing 12–18% chromium, 12–8% nickel and the balance substantially iron. Traces of other metals: niobium, titanium, thorium or tantalum may be added.

Either alternating current or direct current can be employed for the arc-welding in accordance with the invention. Preferably the length of the arc employed is maintained as short as possible; for example, about 3 mm. in order to hinder the action of the gases in the air during the welding operation.

The process in accordance with the invention renders it possible to weld highly stressed structures of non-ferrous metals to produce strengths which are considerably higher than those previously attainable. For example, it is possible in accordance with the invention to weld in copper fire boxes for locomotives in a better and more certain manner than was hitherto possible. Furthermore, as the welding electrode employed is composed of a material which is not only substantially acid-resistant itself, but also when combined with non-ferrous metals welded at the boundaries of the weld obtained, the novel process is well adapted for welding articles and apparatus which are subject to corrosion.

The process in accordance with the invention is not only suitable for joining together non-ferrous metals, but also for joining non-ferrous metals with steel. For example, a steel flange can be welded to a copper tube using an austenitic steel electrode.

The following example will serve to illustrate the manner in which the process in accordance with the invention can be carried out:

Example

The edges of two electrolytic copper sheets 2.5 mm. thick were placed against each other and were butt-welded with a coated austenitic 18–8 chromium-nickel steel electrode of a diameter of about 3.25 mm. A 40-volt direct current of 115 to 125 amperes was employed with the copper sheets as the negative pole and the electrode as the positive pole. The electrode was kept as near upright as possible and an arc length of 3 mm. was used. The temperature of the arc was between about 4200° and 4900° C. An excellent completely porefree weld which was stronger than the sheets joined was obtained.

The edges of the copper sheets joined were blunt and it was not necessary, as is often the case, to bevel the edges to provide a V-shaped trough for the weld.

In place of the copper plates of the above example, copper alloy plates can be welded to produce strong porefree welds; for example, those of aluminum bronze. The copper alloys may contain: 0.5–4% silicon and 0–1% manganese. Other compositions are the following: 5–6% tin, 3–5% lead, 3–9% zinc, and balance copper; or: 5–6.5% tin and balance copper; or 13–15% manganese, 0.5–1.5% iron, balance copper; or: 0–3% lead, 42–35% zinc, balance copper.

The edges of two sheets or strips 5.0 mm. thick and composed of 3.5–5% aluminum and balance copper were bevelled and then placed against each other so that an intermediates space of 2 mm. may remain. A 40-volt direct current of 115 to 125 amperes was employed. The welding method was equally made as in the example mentioned before.

I claim:
1. A process of electric arc welding for joining copper base metal stock which comprises establishing a welding arc between the copper base metal stock and an austenitic alloy steel welding electrode to form a welded joint essentially composed of the austenitic steel from the welding electrode and the copper base metal from the stock welded.

2. A process of electric arc welding for joining copper base metal stock which comprises establishing a welding arc between the copper base metal stock and an austenitic chromium-nickel steel welding electrode to form a welding joint essentially composed of the austenitic steel from the welding electrode and the copper base metal from the stock welded.

3. A process of electric arc welding for joining copper base metal stock which comprises establishing a welding arc between the copper base metal stock and an austenitic chromium-nickel steel welding electrode containing 12–18% chromium and 12–8% nickel to form a welded joint essentially composed of the austenitic steel from the welding electrode and the copper base metal from the stock welded.

References Cited in the file of this patent

UNITED STATES PATENTS

| | | |
|---|---|---|
| 1,750,643 | Murray | Mar. 18, 1930 |
| 1,986,303 | Swift | Jan. 1, 1935 |
| 1,966,260 | Munson | July 10, 1934 |
| 2,320,675 | Swift | June 1, 1943 |
| 2,338,812 | Hood | Jan. 11, 1944 |
| 2,395,373 | Johnson | Feb. 19, 1946 |
| 2,496,347 | Herbst | Feb. 7, 1950 |
| 2,664,622 | Spitz | Jan. 5, 1954 |

FOREIGN PATENTS

| | | |
|---|---|---|
| 233,895 | Great Britain | May 21, 1925 |

OTHER REFERENCES

General Electric Review, March 1926, pg. 167.
Procedure Handbook of Arc Welding, Design and Practice by the Lincoln Electric Co., 8th ed. 1945, pp. 391–392.